United States Patent [19]

Sabatino et al.

[11] Patent Number: 4,509,252

[45] Date of Patent: Apr. 9, 1985

[54] METHOD AND APPARATUS FOR ASSEMBLING BATTERY COMPONENTS

[75] Inventors: Anthony Sabatino, St. Paul; Eugene F. Stanefski, South St. Paul; Ronald N. Romanchuk, Fridley; Edward G. Schaumburg, Askov, all of Minn.

[73] Assignee: GNB Batteries Inc., Mendota Heights, Minn.

[21] Appl. No.: 395,686

[22] Filed: Jul. 6, 1982

[51] Int. Cl.³ ............... H01M 6/04; B23P 19/04
[52] U.S. Cl. .................... 29/623.1; 29/430; 29/464; 29/730; 29/793; 29/794
[58] Field of Search .......... 29/730, 623.1, 623.2, 29/430, 464, 467, 793, 794; 414/222, 225; 198/419, 420

[56] References Cited

U.S. PATENT DOCUMENTS

| | | | |
|---|---|---|---|
| 2,371,026 | 3/1945 | Cattonar et al. | 198/419 |
| 2,626,038 | 1/1953 | Smith | 29/730 |
| 2,684,800 | 7/1954 | Lewis | 198/419 |
| 3,441,448 | 4/1969 | Hayward et al. | 29/623.2 |
| 3,778,314 | 12/1973 | Kano et al. | 29/623.2 |
| 3,883,369 | 5/1975 | Badger et al. | 29/623.1 |
| 4,065,116 | 12/1977 | Lindenberg et al. | 29/730 |
| 4,171,564 | 10/1979 | Acton et al. | 29/623.2 |
| 4,361,316 | 11/1982 | Golz et al. | 29/730 |

FOREIGN PATENT DOCUMENTS 2085645 4/1982 United Kingdom ........... 29/623.1

Primary Examiner—Howard N. Goldberg
Assistant Examiner—P. W. Echols
Attorney, Agent, or Firm—Augustus J. Hipp; Charles L. Rowe

[57] ABSTRACT

A method and apparatus for assembling battery components including a battery case (10) having a plurality of divider walls (32) defining a plurality of side-by-side cell spaces (26,27,28,29,30,31) opening through a top portion of the case. A plurality of intermediate cell elements (34,35,36,37) are provided in the cell spaces intermediate the end cell spaces (26,31) and end cell elements (38,39) having terminal post portions (101) are inserted in the end cell spaces (26,31). The apparatus effects an automatic pickup of the cell elements at one or more insert stations from delivery conveyors (19,20) suitably positions the picked-up cell elements for proper polarity relationship in the inserted disposition within the battery case, and after moving the picked-up cell elements to overlying relationship with the battery case, inserts the cell elements automatically into the proper cell spaces. Control of delivery of the battery cases to the respective insert positions is effected and coordinated with the delivery of the necessary cell elements from apparatus for preforming the cell elements. Apparatus (106) is provided for accurately spacing the end cell elements upon delivery thereof to the pickup position. The pickup structure (50) includes finger devices (59,60) arranged to engage plate connecting straps (45,98,100) provided on the cell elements in effecting positive pickup, transfer and insertion thereof.

70 Claims, 18 Drawing Figures

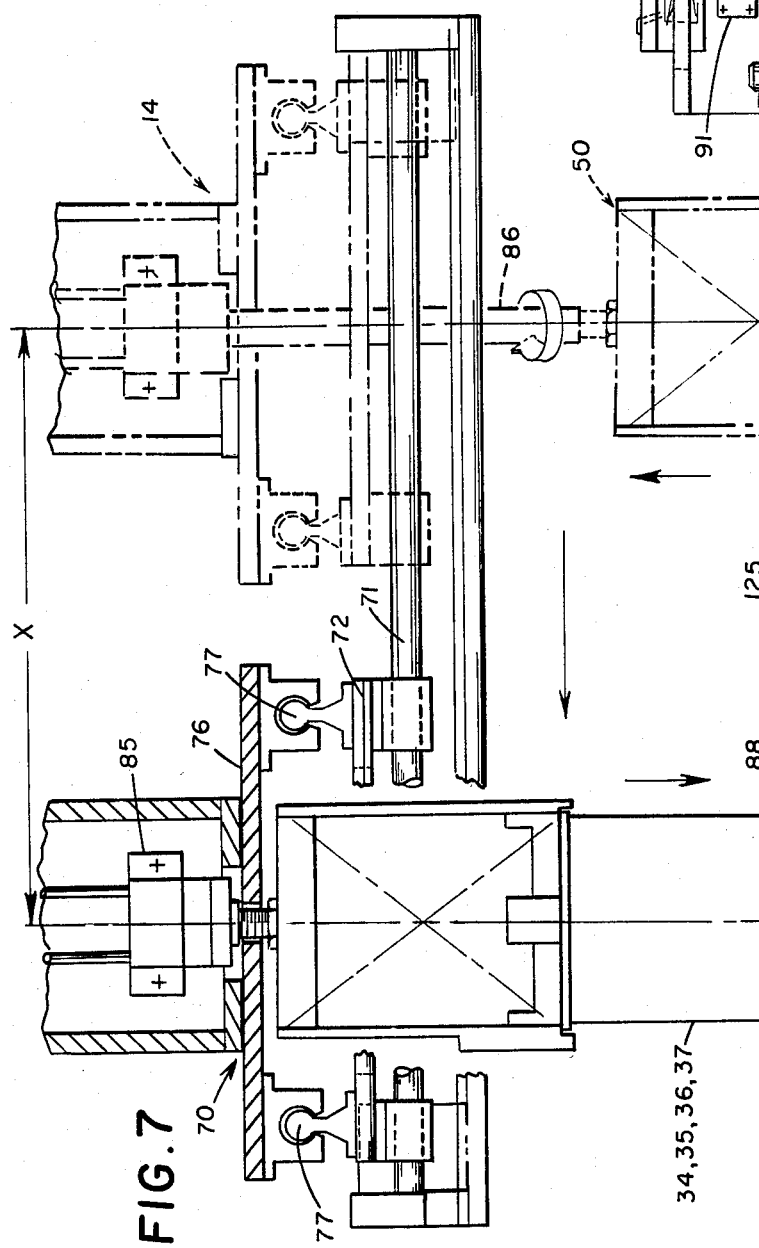
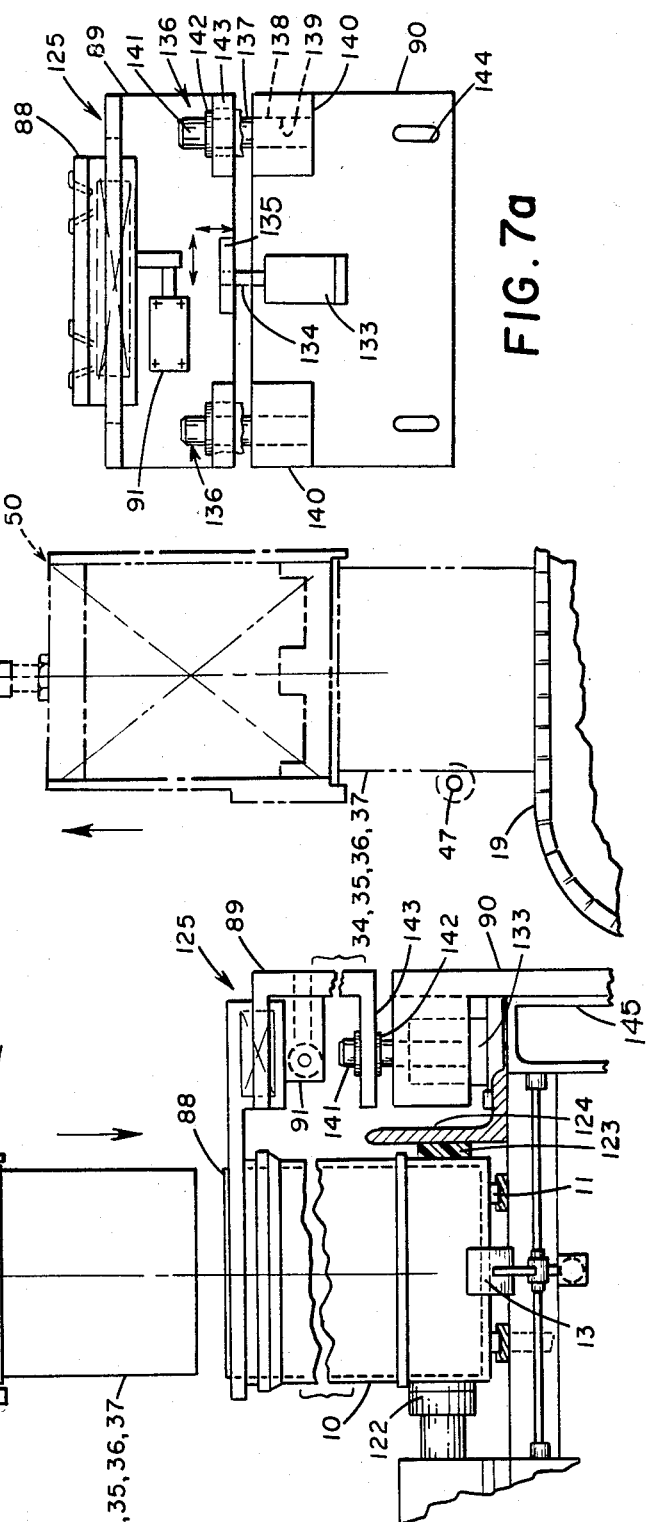
FIG. 7
FIG. 7a

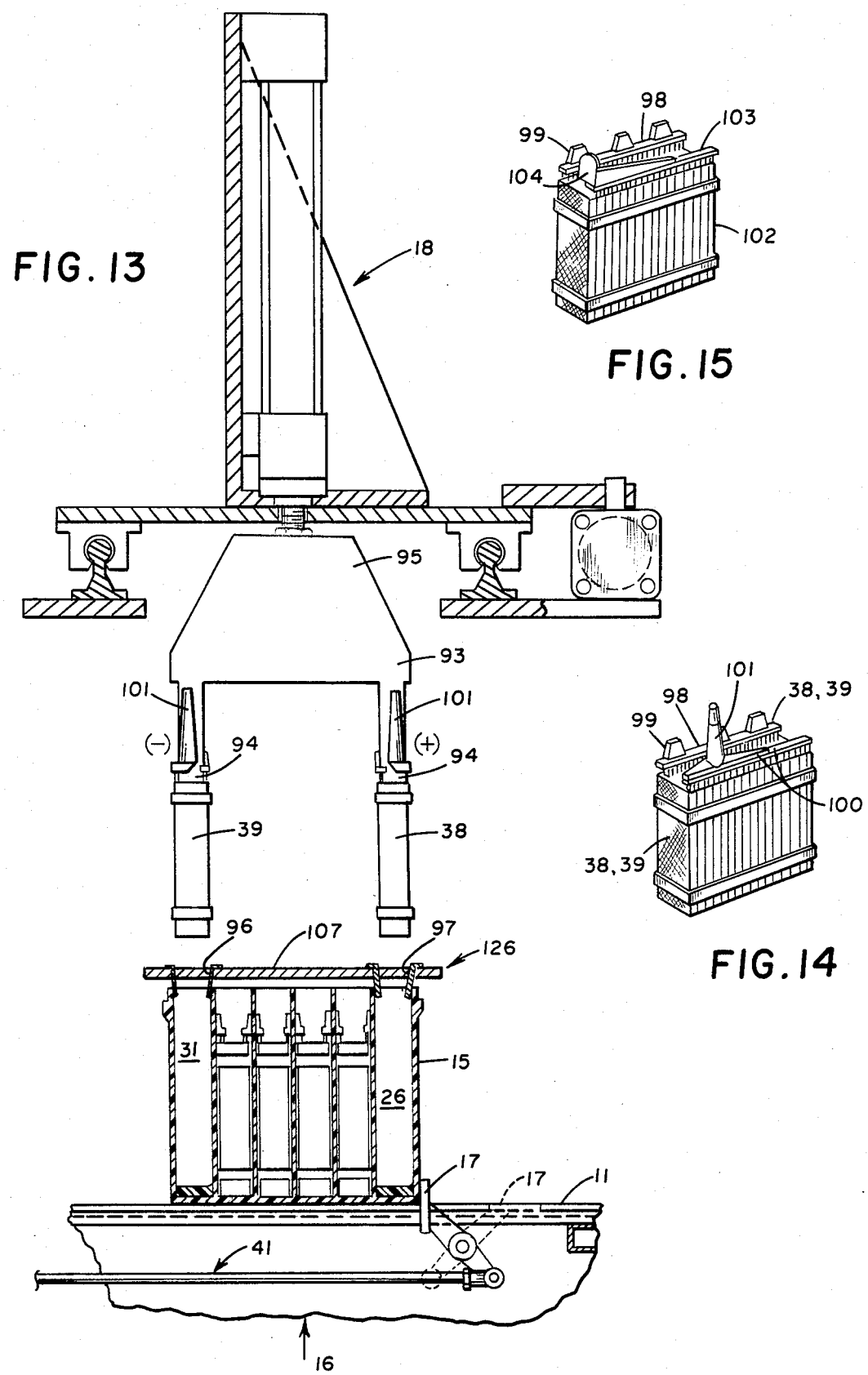

METHOD AND APPARATUS FOR ASSEMBLING BATTERY COMPONENTS

RELATED APPLICATIONS

Klang et al, U.S. Ser. No. 352,924, filed Feb. 26, 1982, for: Lead-Acid Battery and Method of Making Same; a continuation-in-part of U.S. Ser. No. 254,772, filed Mar. 20, 1981.

TECHNICAL FIELD

This invention relates to the manufacture of batteries, and in particular to apparatus and methods for assembling battery components.

BACKGROUND ART

A secondary battery includes a battery case having a plurality of partition walls defining a plurality of side-by-side cell spaces opening through a top portion of the battery case. Cell elements are placed in the respective cell spaces. The cell elements are interconnected suitably to provide the desired output voltage between terminals of end cell elements.

In such a battery construction, the cell elements themselves are made up of a plurality of individual plates of like polarity interconnected in parallel by suitable connecting straps. The connecting straps, in turn, define connections providing series interconnection between the respective cell elements.

In such battery constructions, the intermediate cell elements are similar. The end cell elements differ from the intermediate cell elements in the provision of terminal means thereon for providing terminal connections either through the top cover portion of the completed battery or through a sidewall portion thereof, as desired.

In inserting such battery elements into the container cells, such assembly has primarily been accomplished by a hand operation utilizing boxing inserts, or guides, to assist in inserting the elements into the respective intermediate and terminal or end cells, although mechanical apparatuses are also known for accomplishing insertion of the element into a cell.

Heretofore, such battery assembly has been relatively expensive, slow and requires an inordinate amount of undesirable element handling, which frequently results in damage to separators and shedding of active material.

DISCLOSURE OF INVENTION

The present invention comprehends an improved method and apparatus for inserting battery cell elements into the battery container or case. The method and apparatus provide an automatic, economical battery assembly operation, substantially reducing the time and cost of assembly and providing improved and accurate assembly thereof.

In a more general or broader aspect, the invention includes an apparatus having at least one insert station where the element insertion operation is performed and includes means for positioning a battery container or case at said insert station with the open top portion uppermost, means for sensing a container in position, means for engaging and picking up at least one cell element, means for moving said cell element to an aligned position over a predesignated container cell space, and means including guide means for inserting said cell element into said predesignated cell space with the electrical interconnecting means uppermost and in proper position for making the desired electrical connections to said element. Likewise, in the broader sense, the method includes the steps of providing at least one insert station, positioning a battery container at said insert station with the open top portion uppermost, sensing a container in position, engaging and picking up at least one cell element, moving said cell element to an aligned position over a presdesignated container cell space, and inserting said cell element into said predesignated cell space with the electrical interconnecting means uppermost and in proper position for making the desired electrical connections to said element.

As shown more specifically in the illustrated embodiment, the apparatus and method include the means for, and the steps of, engaging and picking up, aligning and guidedly inserting a plurality of cell elements into the cell spaces with the proper polarity and connector arrangement for making the desired intercell connections.

The invention further comprehends that the intermediate cell elements may be engaged and picked up, aligned and inserted singularly, or in pairs, or other combinations, sequentially or in any desired order of insertion in predesignated cell spaces for facilitated manufacture.

The invention comprehends that the insertion of the terminal or end cell elements may be carried out at an insert station different from the insert station in which the intermediate cell elements are inserted into the battery case, and in the preferred embodiment, the invention comprehends the provision of apparatus including means for positioning a battery case at a first insert station with the top portion uppermost, means for sensing a container in position, means for engaging and picking up a first pair of intermediate cell elements, means for moving said cell elements to an aligned position over a first pair of predesignated intermediate cell spaces with the interconnecting means uppermost, means for guiding and inserting said intermediate cell elements into said intermediate cell spaces, with said intermediate cell elements having proper polarity arrangement for making the desired series connections between elements in adjoining cells, means for sensing, engaging and picking up, aligning and inserting a second pair of intermediate cell elements and repeating the same steps as for insertion of said first pair of intermediate cell elements, means for repositioning the battery case with the two pair of intermediate cell elements therein at a second insert station with the top uppermost, means for sensing a container in position, means for engaging and picking up a pair of end cell elements to position one each over the respective end cell spaces with the interconnecting means and terminal means uppermost, and means for guiding and inserting said end cell elements one each into said end cell spaces, including means for causing the end cell elements to have a preselected disposition of the connecting means and terminal means thereof prior to the inserting thereof into the respective end cell space to provide the desired polarity arrangement of the respective end cell element for making series connection thereof to the intermediate cell element in the respective adjoining cell space. It is thus readily seen that by proper selection of the insertion sequence, a single element, a pair of elements, or any other combination of intermediate or terminal elements may be programmed for insertion in any desired sequence and in designated cells as selected.

The preferred method of assembling such battery elements includes the steps of positioning a battery case at at least one insert station with the top portion uppermost, sensing a container in position, engaging and picking up a first pair of intermediate cell elements, moving said cell elements to an aligned position over a predesignated pair of intermediate cell spaces with the interconnecting means uppermost, guiding and inserting said intermediate cell elements into said intermediate cell spaces, the intermediate cell elements having a preselected disposition of the connecting means thereof prior to the inserting step to provide the intermediate cell elements in said cell space with the desired proper polarity arrangement for making series connections between adjacent cell elements, repeating for a second pair of intermediate cell elements the steps of sensing, engaging and picking up, aligning and inserting as for said first pair of intermediate cell elements, sensing a container in position, engaging and picking up a pair of terminal or end cell elements, moving said pair of end cell elements to aligned positions one each over the respective end cell spaces with the interconnecting means and terminal means uppermost, and guiding and inserting said end cell elements into the respective end cell space, the end cell elements having a preselected disposition of the connecting means and terminal means thereof prior to the inserting thereof into the end cell spaces to provide the desired polarity arrangement of the respective end cell element for making suitable series connection thereof to the respective adjoining intermediate cell element.

The invention, in broad aspect, further comprehends that the cell element be provided with one or two plate-connecting straps and the step of picking up the cell element comprises a step of picking it up by at least one of the connecting strap.

The invention further comprehends such a method of inserting battery elements wherein the battery case is repositioned in a different insert position subsequent to the insertion of the requisite intermediate cell elements.

The invention further comprehends the insertion of the cell elements with the intercell connecting means thereof disposed below the level of the top of the divider or partition walls for subsequent connection between the adjacent cell elements through the divider walls.

The invention further comprehends the novel apparatus utilized in picking up, holding, and inserting the cell elements.

Thus, the method and apparatus for inserting battery elements of the present invention are simple and economical, while yet providing an automatic, high speed assembly of such battery components for improved low cost, high accuracy manufacture of such batteries.

BRIEF DESCRIPTION OF THE DRAWING

Other features and advantages of the invention will be apparent from the following description taken in connection with the accompanying drawing wherein:

FIG. 7 is a fragmentary side elevation illustrating in greater detail the step of transferring the intermediate cell elements from a delivery conveyor into the battery case;

FIG. 7a is an end elevation of the guide plate means of FIG. 7;

FIG. 13 is a fragmentary end elevation of the means for engaging and picking up, moving, and inserting the end cell elements into the battery case, illustrating the arrangement thereof with the end cell elements being carried thereby immediately prior to the step of inserting the end cell elements into the end cell spaces of the battery case;

FIG. 14 is a perspective view of the end cell elements as shown in FIG. 13;

FIG. 15 is a perspective view of a modified form of end cell element arranged for connection of the terminal of the battery through the sidewall of the battery case;

BEST MODE FOR CARRYING OUT THE INVENTION

Figure 1:
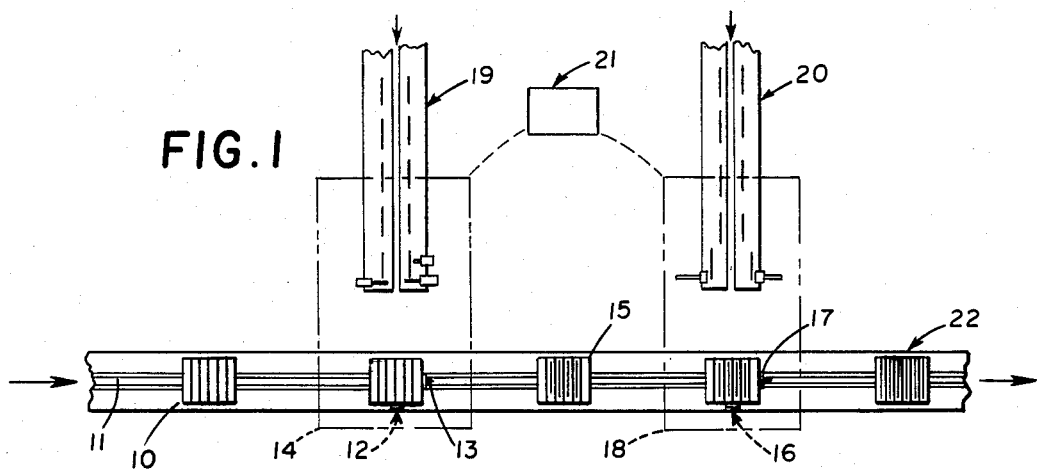
FIG. 1 is a schematic plan view illustrating the interrelationship between the components of the apparatus provided in practicing the invention.

In the illustrative embodiment of the invention as disclosed in the drawing, an empty battery case, generally designated 10, is brought on a conveyor, generally designated 11, to a first insert station, generally designated 12, wherein the battery case is retained in a preselected insert position by a suitable stop 13 associated with the conveyor and clamp 122 urging the case against a positioning pad 123. Upon the case being so disposed, a guide means 125 is brought into aligned disposition with the battery case. An element engagement, pickup, alignment and insert apparatus, generally designated 14, is provided at first insert station 12 for engaging and picking up intermediate cell elements from a conveyor, generally designated 19, and inserting them into the cells of the battery case. In the illustrated embodiment, the battery case, with the inserted intermediate cell elements, is then transferred by the conveyor 11 as a partial assembly 15 to a second insert station, generally designated 16, where the partially assembled battery case 15 is retained by means of a stop 17 for receiving a pair of terminal, or end, cell elements transferred thereto by a second engaging and pickup, alignment and insert apparatus, generally designated 18, receiving the end cell elements on a second feed conveyor, generally designated 20.

As illustrated schematically in FIG. 1, the engaging and pickup, alignment and insert apparatuses 14 and 18 may be controlled by a suitable control, generally designated 21 which illustratively may comprise a conventional microprocessor control suitably programmed to effect the operation of the apparatuses 14 and 18 in conjunction with the conveyors 11, 19, and 20, and other associated apparatus (not shown) for carrying out the cell element insertion step automatically as a portion of an overall battery manufacture.

Upon completion of the insertion of the end cell elements into the battery case 10, the assembly of the battery case and inserted intermediate and end cell elements, generally designated 22, is transferred from the second insert station 16 by the conveyor 11 for subsequent battery manufacturing operations, as desired.

Figure 8:
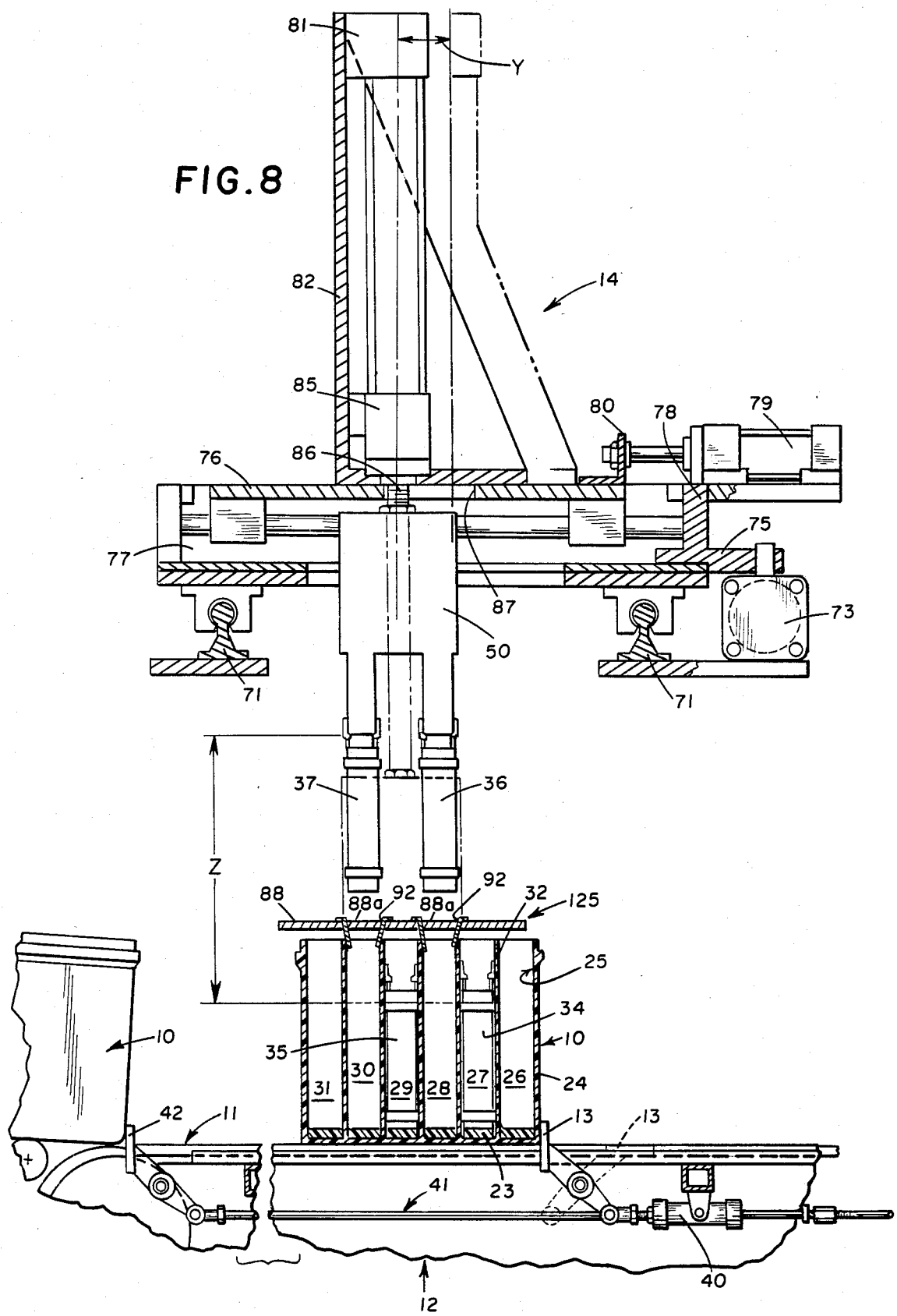
FIG. 8 is an end elevation illustrating in greater detail the step of inserting a second pair of intermediate cell elements into the battery case.

As best seen in FIG. 8, battery case 10 comprises a bottom wall 23 and a peripheral upstanding sidewall 24 defining an upwardly opening cell element receiving space, generally designated 25. Space 25, in turn, is divided into individual cell spaces 26, 27, 28, 29, 30, and 31, by a plurality of divider or partition walls 32. As illustrated in FIG. 8, the divider walls extend substantially to the plane of the top edge of the peripheral sidewall 24.

In the illustrated embodiment, cell spaces 27,28 29 and 30 comprise intermediate cell spaces, with the cell spaces 26 and 31 defining terminal or end cell spaces of the battery case. The present invention is concerned with the provision of intermediate cell elements, such as cell elements 34, 35, 36, and 37, and intermediate cell spaces 27, 28, 29 and 30, as illustrated in FIG. 8, and end cell elements 38 and 39 in the end cell spaces 26 and 31, as illustrated in FIG. 13.

As further illustrated in FIG. 8, stop 13 is actuated by a suitable fluid-operated actuator 40 (herein a pneumatic actuator) and linkage 41 for selected disposition of the stop in a battery case stopping position illustrated in full lines in FIG. 8, and in a retracted, battery case passing disposition, as illustrated in broken lines therein. Linkage 41, as seen in FIG. 8, further controls a second stop 42 for retaining a subsequent battery case in position for delivery thereof to the insert station 12 upon completion of the operations relative to the insertion of the cell elements into the first battery case. As illustrated, the linkage 41 effects a concurrent operation of stops 13 and 42 see (FIG. 8) to effect concurrent transfer of the battery case 10 (see FIG. 1) from the first insert station 12 to the second insert station 16 (see FIG. 1), and the delivery of the succeeding battery case 10 beyond stop 42 into the first insert station 12.

As further illustrated in FIG. 13, the linkage 41 further controls a third stop 17 for retaining the partial assembly 15 in position at second insert station 16 for receiving the terminal or end cell elements 38 and 39 therein. As illustrated, linkage 41 causes a concurrent selective disposition of stop 17 in an operative position, as shown in full lines in FIG. 13, and a retracted disposition, as shown in broken lines therein, for the selective stopping of the partial assembly 15 and passing of the filled case 22 from the second insert station on the conveyor 11 upon completion of the fill element insertion steps.

Figure 6:
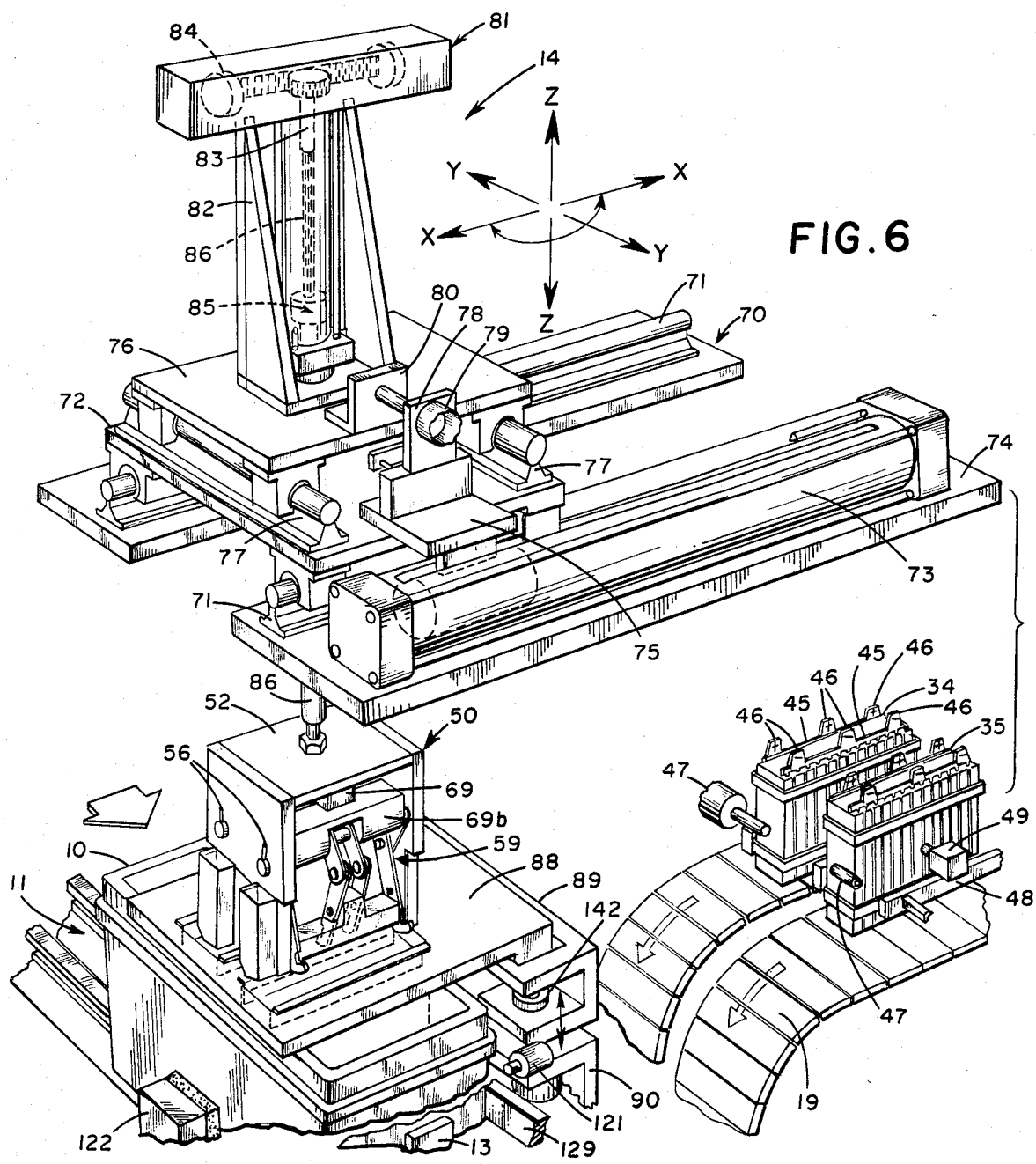
FIG. 6 is a fragmentary perspective view illustrating the apparatus for providing the intermediate cell elements into the battery case, showing the pickup head with the bottom support portion removed.

As illustrated in FIG. 6, an additional sensor 121 is provided on a bracket 90 for sensing the presence of the battery case in the insert position to permit control 21 to suitably prevent delivery of cell elements in the absence of a battery case suitably positioned to receive them. As discussed above and as illustrated in FIG. 6 and further in FIG. 7, the battery case may be accurately positioned in the cell receiving disposition by the clamp 122 urging the battery case against the pad 123 carried by a back rail 124 at one side of conveyor 11.

Figure 2:
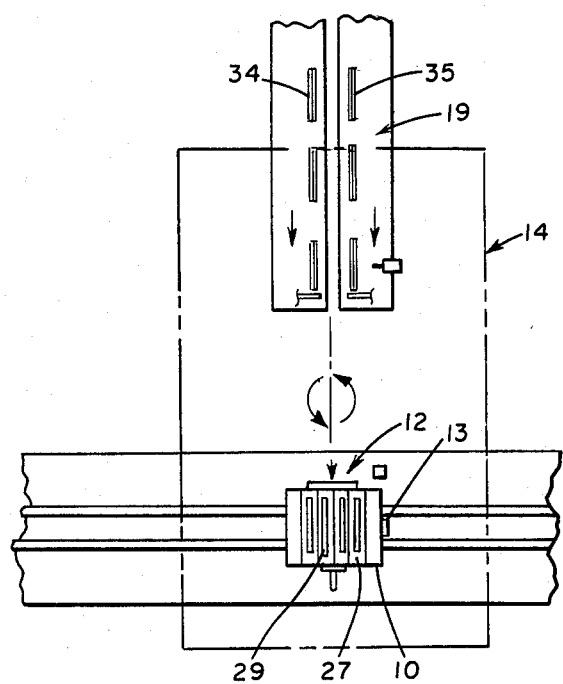
FIG. 2 is a fragmentary schematic plan view illustrating in greater detail the insertion of a first pair of intermediate cell elements in the battery case.

As schematically illustrated in FIGS. 2 through 5, the invention comprehends a unique delivery of different cell elements to the battery case selectively in the insert station 12 and 16 by the apparatuses 14 and 18. As illustrated in FIG. 2, a first pair of intermediate cell elements 34 and 35 is brought to the apparatus 14 by the feed conveyor 19. The pair of intermediate cell elements 34 and 35 is picked up by the apparatus 14, which may be selectively rotated 180° to provide proper polarity of the respective cell elements in the assembled battery, moved to an overlying relationship relative to the battery case 10 being retained in the insert station 12 by the stop 13, and inserted through the guide means 125 into predesignated cell spaces 28 and 30.

Figure 3:
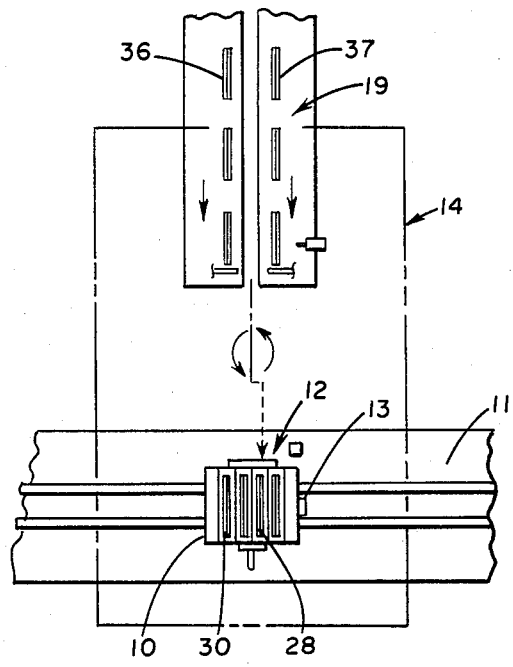
FIG. 3 is a fragmentary schematic plan view illustrating the step of inserting a second pair of intermediate cell elements into the battery case.

As seen in FIG. 3, a second pair of intermediate cell elements 36 and 37 is then picked up by the apparatus 14 from conveyor 19, rotated 180°, moved to overlying relationship with the battery case 10, and inserted through repositioned guide means 125 into predesignated cell spaces 27 and 29, as illustrated in FIG. 8 in greater detail.

Figure 4:
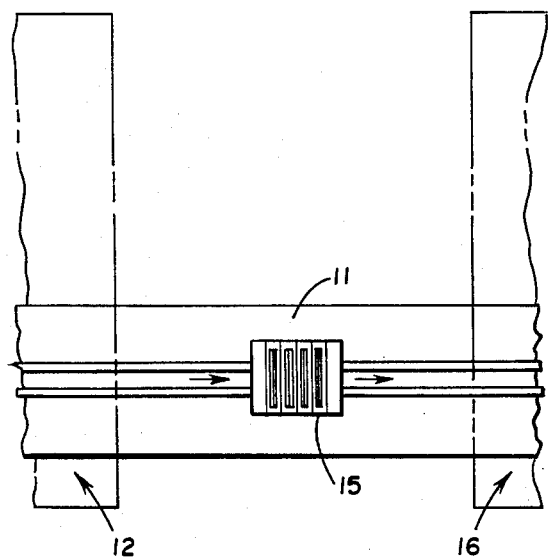
FIG. 4 is a fragmentary schematic plan view illustrating the movement of the battery with the inserted pairs of intermediate cell elements from a first to a second insert station.

Upon completion of the insertion of both sets of intermediate cell elements, stop 13 is lowered, permitting the conveyor 11 to transfer the partial assembly 15 to the insert station 16 from insert station 12, as illustrated in FIG. 4.

Figure 5:
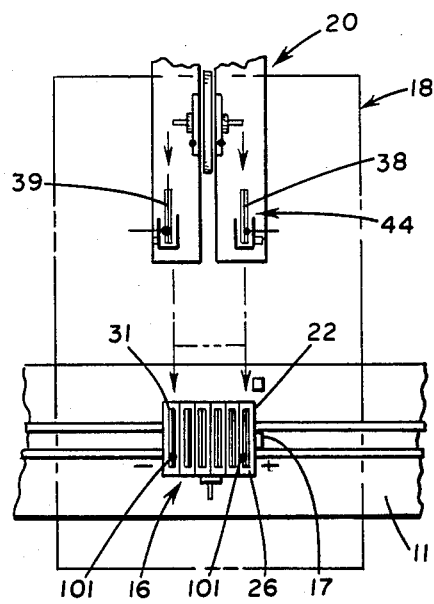
FIG. 5 is a fragmentary schematic plan view illustrating the step of inserting the end cell elements into the battery case.

As shown in FIGS. 5 and 13, with the partial assembly 15 being retained in position at insert station 16 by the stop 17, second pickup and insert apparatus 18 picks up a pair of end cell elements 38 and 39, transfers them into overlying relationship with the partial assembly 15, and inserts the end cells elements 38 and 39 through a second guide means 126 into the predesignated end cell spaces 26 and 31, respectively, to complete the insert operation.

Suitable subsequent operation of the stop actuator 40 by concurrently moving each of stops 42, 13, and 17 to the retracted case-passing disposition, permits concurrent delivery of an unfilled case 10 to the first insert station, transfer of the partial assembly 15 from the first insert station to the second insert station, and the transfer of the filled case 22 by conveyor 11 from the second insert station for further manufacturing operation thereon.

As illustrated schematically in FIG. 5, the end cell elements 38 and 39 are caused to have a suitable wide spacing for alignment with the end cell spaces 26 and 31 of the battery case by a suitable spacing apparatus 44 associated with the second pickup apparatus 18.

The cell elements are positioned on conveyors 19 and 20, with the polarity thereof as desired, so that cell elements may be transferred into the battery case in any desired final arrangement of polarity. Thus, either the end cell element 38 or 39 illustrated in FIG. 5 may selectively be the positive terminal cell and the other the negative terminal cell, and both may have the terminal post at the front as shown, or reversely, may have the terminal post at the rear, as desired. Similarly, the intermediate cell elements 34,35,36,37 illustrated in FIGS. 2 and 3 may be suitably delivered on the conveyor for delivery to the battery case by apparatus 12 selectively with or without 180° end-to-end rotation, as illustrated by the arrows.

Figure 11:
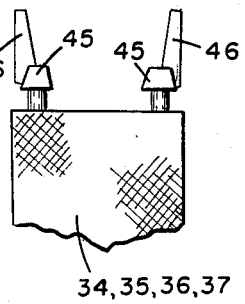
FIG. 11 is a fragmentary end elevation of the battery cell elements illustrating in greater detail the plate connecting straps engaged by the engaging and pickup means illustrated in FIG. 10.

As indicated briefly above, each of the intermediate cell elements is defined by a plurality of battery cell plates, which are interconnected to define the respective cell elements. As seen in FIG. 6 and FIG. 11, the plate interconnections in the intermediate cell elements are effected by a pair of connector straps 45, each having three upstanding connector lugs 46 formed integrally therewith. The connector straps and lugs may be cast integrally with the upper end of the battery plates (not shown) to provide an electrical interconnection between the plates and provide means for interconnecting respective cell elements to each other.

As seen in FIG. 6, the intermediate cell elements are delivered by conveyor 19 to a pickup position wherein they are retained by suitable stops 47. The cell elements are guided to the pickup position by suitable guide rails 48 and the disposition of the elements in the pickup position is sensed by a suitable sensing device, such as photocell 49, suitably connected to control 21 in effecting an automatic signalling and control operation.

Figure 9:
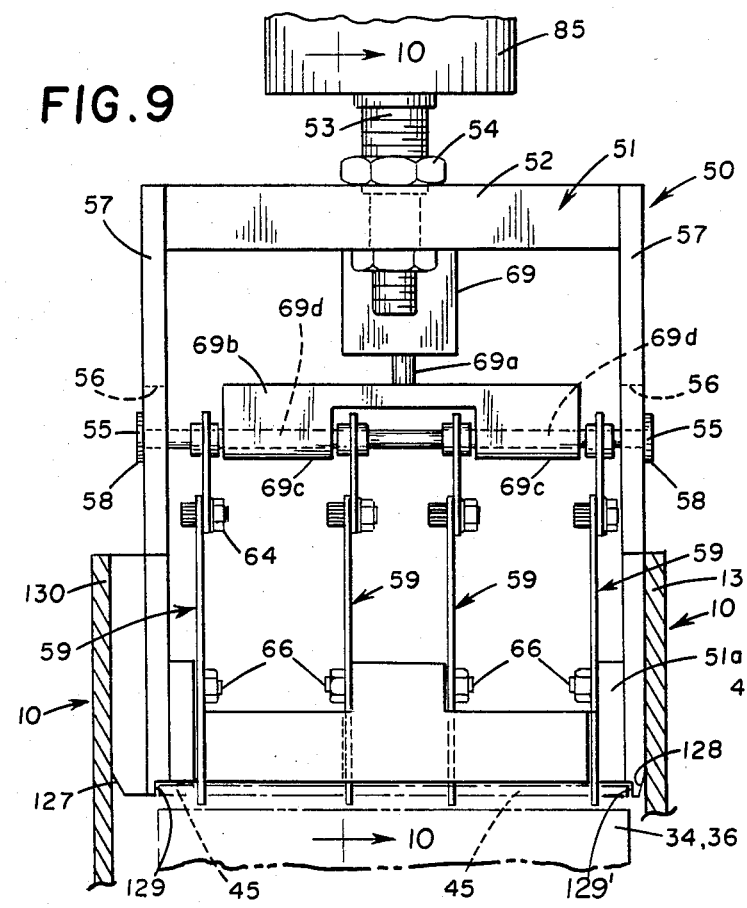
FIG. 9 is a fragmentary side elevation of the pickup means for engaging and picking up intermediate cell elements and transferring them from the delivery conveyor to the battery case.

As best seen in FIG. 6, apparatus 14 includes a pickup head, generally designated 50. The pickup head, as further shown in FIG. 9, includes a downwardly opening U-shaped frame 51 having a top wall 52 carried by a downwardly extending threaded shaft 53 (FIG. 9). The shaft is locked to the top wall 52 by suitable nuts 54 providing for vertically adjustable disposition of the frame on the shaft.

A pair of carrier rods 55 are arranged to have their opposite ends extend through spaced vertical slots 56 in the frame end walls 57 (FIG. 9) for vertical reciprocable movement of the horizontally extending rods. As shown in FIG. 9, the opposite ends of the rods are provided with collars 58 to effectively maintain the rods against axial displacement between the frame and walls 57.

Figure 10:
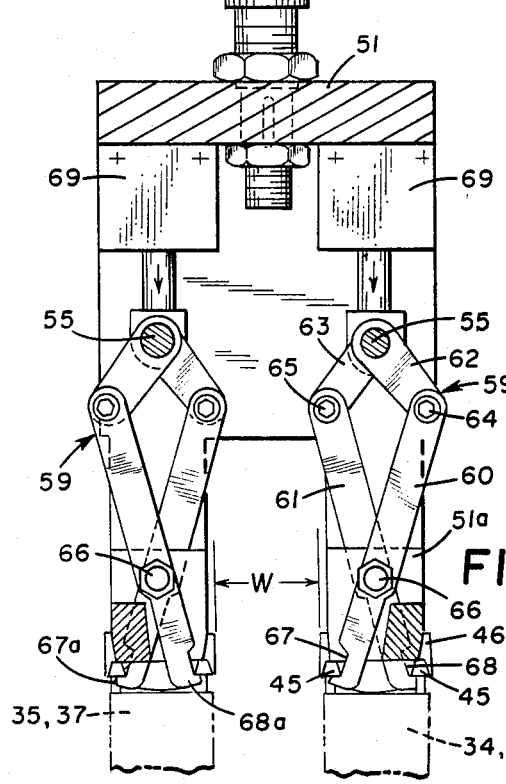
FIG. 10 is a fragmentary end elevation of the engaging and pickup means of FIG. 9.

As illustrated in FIGS. 6, 9, 10 and 12, the pickup head is further defined by four pickup finger devices, generally designated 59. Each finger device includes a pair of long finger members 60 and 61, and a pair of connecting links 62 and 63. The links are pivotally connected at one end to the carrier rod 55 and are pivotally connected at their opposite ends to the fingers 60 and 61, respectively, by pivots 64 and 65. The fingers, in turn, are pivotally interconnected at a position remote from pivots 64 and 65 by a fixed pivot 66. The distal ends of the fingers 60 and 61 are provided with notches 67 and 68, respectively, defining turned ends 67a and 68a engaging the underside of the connector straps 45 of the cell elements from a position intermediate the connector straps, as illustrated in FIG. 10.

Figure 12:
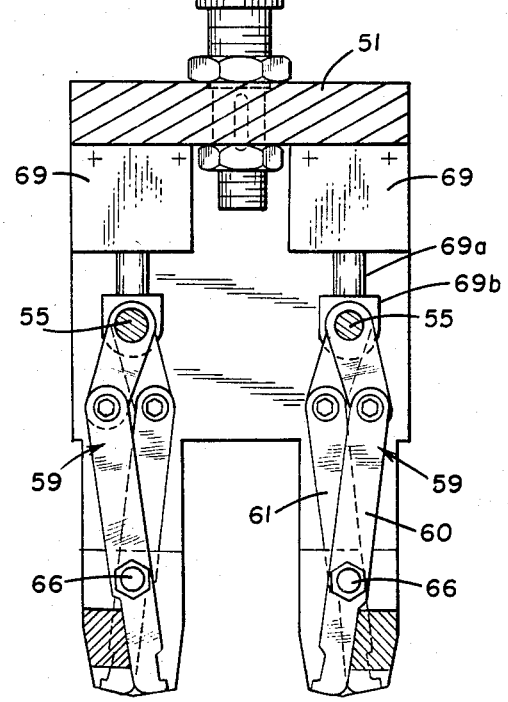
FIG. 12 is an end elevation of the engaging and pickup means with the pickup device in a retracted disposition.

Outward movement of the notched end portions of fingers 60 and 61 from a retracted position thereof, as illustrated in FIG. 12, to the extended disposition thereof illustrated in FIG. 10, is effected by a downward movement of carrier rods 55 by suitable actuators 69 carried on the underside of top wall 51, as seen in FIGS. 9 and 12. Each actuator 69 includes an output rod 69a secured to a connector 69b having downwardly enlarged end portions 69c provided with through bores 69d receiving the carrier rod between the pairs of finger devices 59 at the opposite sides of the pickup device 50. As further illustrated in FIG. 9, the finger pivots 66 are carried on a bottom support portion 51a of the frame so that upon downward movement of the carrier rods 55 by the actuators 69, as further illustrated in FIG. 10, bottom support portion 51a seats on the top of the straps 45 and the pickup finger devices 59 are operated such that the pivots 64 and 65 move apart and the notched end correspondingly move apart into engagement with the underside of the cell element connector straps 45 to cooperate with the bottom support portion 51a in positively clamping the straps 45 therebetween.

In the retracted disposition of FIG. 12, the notched lower ends of the fingers 60 and 61 are overlapped sufficiently so as to have a total width of less than the spacing between the connector straps 45 shown in FIG. 11 so that the fingers may be readily inserted downwardly therebetween for subsequent outward movement into engagement therewith.

As seen in FIG. 9, as the elements are being moved into the cell spaces, the end walls 57 of pickup head 50 are guided into the battery case by beveled surfaces 127,128 on the lower outer edges, thereof.

As further seen in FIG. 9, the lower edges of end walls 57 define inwardly facing corner surfaces 129,129' engaging the opposite ends of the connector straps 45 to accurately position the straps and the cell elements on the pickup head and thus permit the connector lugs to correspondingly be accurately positioned between the battery case sidewalls 130,131 as a result of the pickup head being accurately located between the sidewalls.

Pickup head 50 is brought into overlying relationship with the cell elements positioned by stops 47 on the delivery conveyor 19 by a transport mechanism, generally designated 70. As seen in FIG. 6, the transport mechanism is arranged to move the pick-up head 50 in mutually perpendicular directions, X, Y and Z. For movement of the head in the X direction, the transport mechanism includes a pair of rails 71 slidably carrying a support plate 72. A linear positioning device 73 is mounted on a support 74 carrying one of the rails 71, and is connected through a connector 75 to the support plate 72 for selectively controlling movement of the support plate reciprocably along the slide rails 71 under the control of controller 21.

As further illustrated in FIG. 6, a second support plate 76 is slidably carried on a pair of rails 77 carried on first support plate 72 and extending perpendicularly to the direction of extent of rails 71.

Upstanding from connector 75 is a mounting plate 78 carrying a positioning device 79 connected to second support plate 76 by a connector 80. Thus, support plate 76 moves with support plate 72 in the X direction while being movable relative to the support plates 72 in the Y direction under the control of the positioning device 79.

To provide the selective end-to-end rotation of the intermediate cell elements, a rotating device 81 (FIG. 6) is mounted on an upright support 82 carried by the support plate 76. As illustrated, the rotating device illustratively comprises a rack and pinion means having an output shaft 83 selectively rotatable about a vertical axis as a result of the operation of a rack positioning means 84 of the device 81. An extensible head carrier, generally designated 85, is splined to the shaft 83 for vertical reciprocal positioning of the pickup head 50 while permitting rotation of the pickup head about the vertical axis of shaft 83 to effect the 180° rotation thereof illustrated in FIGS. 2 and 3.

As seen in FIGS. 6 and 8, the head carrier 85 is mounted to support 76 through the upright support 82 and is provided with a depending hanger rod 86 extending through a suitable opening 87 in the support plate 76 for carrying the pickup head 50. Thus, the pickup head is translatable vertically with the reciprocably positionable hanger rod 86, as well as being rotatable therewith. The hanger rod, in turn, is linearly translatable in the X direction by the positioning of support plate 72 on the rails 71, and in the Y direction by the translation of the support plate 76 on the rails 77. Thus, the pickup head is provided with the necessary degrees of movement for picking up the cell elements at the pickup position on conveyor 19, raising them to clear the top of the battery case, selectively effecting a 180° rotation thereof, when required, to provide the cell elements in proper polarity relationship with the other cell elements of the battery construction, transport them to an overlying relationship with two spaced cell spaces of the battery case, and inserting the two picked-up cell elements concurrently into the spaced cell spaces through guide means 125.

As discussed above, to control the accuracy of insertion of the elements into the cell spaces, the invention comprehends the provision of guide means. Guide means 125, as shown in FIG. 7, illustratively includes the guide plate 88 slidably mounted on a support 89 carried on a side bracket 90 adjacent the conveyor 11. A positioning device 91 (see FIG. 7) is mounted to support 89 connected to the guide plate 88 for selectively positioning the plate in overlying indexed relationship to the subjacent battery case.

As further illustrated in FIGS. 7 and 7a, guide plate 88 is selectively vertically positioned by a positioning device 133 mounted to side bracket 90 and having an output rod 134 connected to a flange 135 on support 89. A pair of guides 136 is provided at opposite sides of support 89 and side bracket 90, as seen in FIG. 7a. Each guide 136 includes a guide pin 137 having a lower end 138 fixed in a bore 139 of a mounting block 140 carried by the side bracket 90. The upper end 141 of the guide pin extends slidably through a bushing 142 mounted in a flange 143 provided on the lower end of the support 89.

As seen in FIG. 7a, side bracket 90 is provided with mounting slots 144 for receiving suitable threaded fasteners in securing the side bracket to the conveyor frame 145.

As best seen in FIG. 8, guide plate 88 is provided with a pair of guide openings 92 and depending guide element 88a aligned with openings 92 to bear against the upstanding case walls to guide the cell elements into the top portion of the respective cell spaces as the cell elements are moved downwardly therethrough fully into the subjacent cell spaces.

Guide means 126 is similar to guide means 125, as illustrated in FIG. 7, with exception of the omission of the indexing positioning device 91.

The positioning device 91 selectively positions guide plate 88 so as to cause openings 92 to overlie cell spaces 28 and 30 during the insertion of intermediate cell elements 34 and 35 thereinto, or overlie cell spaces 27 and 29 for guiding cell elements 36 and 37 thereinto, as illustrated in FIG. 8.

Control 21 effects coordinated control of the elements of the pickup and insert apparatus 14 to effect an automatic pickup, transfer and guided insertion of the intermediate cell elements into the battery case, as discussed above. Upon completion of the insertion of all the intermediate cell elements, as indicated above, the conveyor stops are lowered so as to permit transfer of the partial assembly 15 to the second insert station 16 for guided insertion into the battery case of the end cell elements 38 and 39 more specifically illustrated in FIGS. 5, 13, 14, 16 and 17. As shown in FIG. 13, the second pickup and insert apparatus 18 is generally similar to pickup and insert apparatus 14 except for the provision therein of a modified form of pickup head 93, which is similar to pickup head 50 except for a wider spacing between the pickup finger devices 94 and provision of a clearance space to accommodate a terminal post 101. As seen in FIG. 13, the end walls 95 of the pickup head frame arrange to support the pickup fingers in the wider spacing corresponding to the spacing between the end cell spaces 26 and 31 of the battery case.

As further illustrated in FIG. 13, the guide plate 107 of apparatus 18 is provided with a pair of guide openings 96 and 97 which are spaced apart to be in accurate alignment with the end cell spaces 26 and 31 so as to provide a guiding of the end cell elements 38 and 39 similar to the guiding action of guide plate discussed above relative to the intermediate cell elements.

A typical end cell element is illustrated in FIG. 14 wherein a connector strap 98 is provided with suitable upstanding lugs 99 corresponding to connector strap 45 and lugs 46 of the intermediate cell elements. However, as illustrated in FIG. 14, the connector strap 100 at the opposite side of the top of the end cell elements 38,39, is provided with the terminal post 101 in lieu of the lugs 99. As shown in FIG. 13, the end cell elements are arranged with the terminal posts disposed outwardly at the opposite ends of the battery case, and with the lugs 99 disposed inwardly for connection of the next inwardly intermediate cells 27 and 30.

As indicated briefly above, in certain battery constructions, the terminal posts are brought outwardly through the sidewall of the battery case in a suitable side terminal end cell element 102, as illustrated in FIG. 15. As shown therein, the connector strap 103 is provided with a suitable horizontally extending terminal connector 104. The pickup head 93 engages the straps 98 and 103 of the side terminal cell element 102 in a manner similar to the engagement with the connector straps of the cell elements 38 and 39 and intermediate cell elements, 34, 35, 36 and 37, as discussed above.

Thus, the second pickup and insert apparatus 18 is substantially identical to first pickup and insert apparatus 14 and functions in a substantially similar manner except for the wider spacing of the pickup finger devices 94 coordinated with the wider spacing of the end cell spaces.

Figure 16:
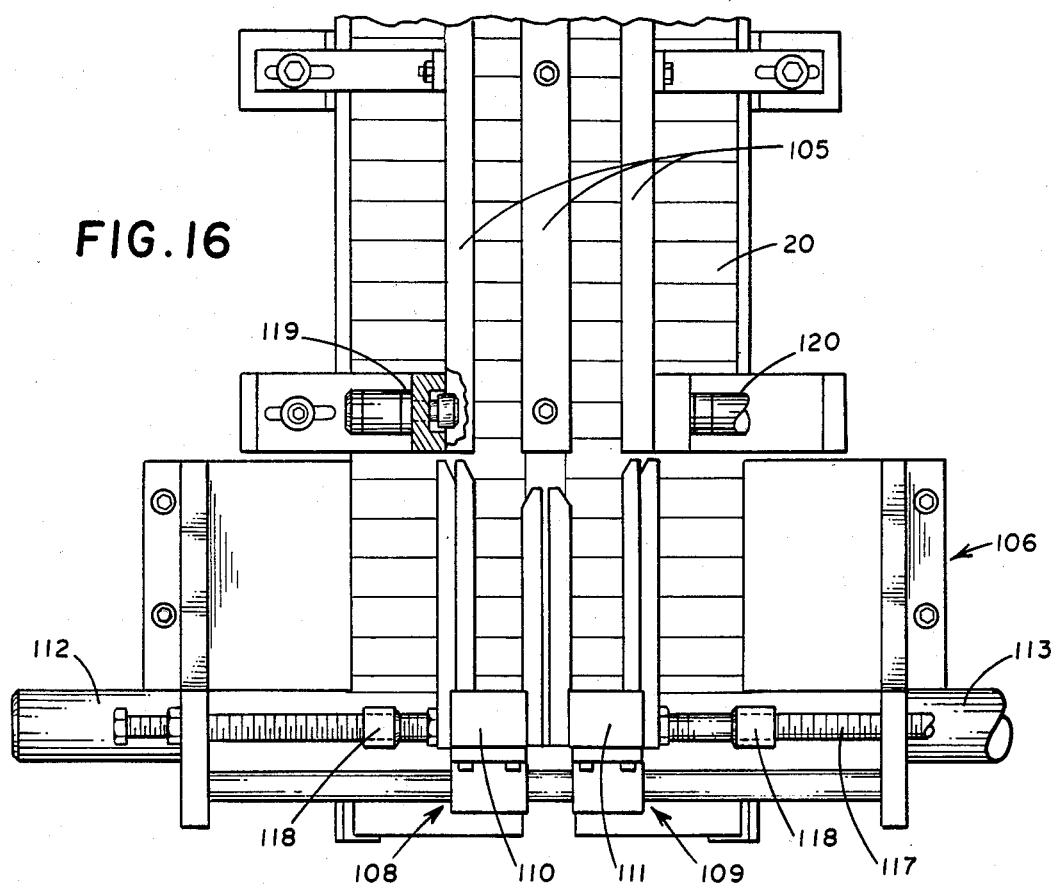
FIG. 16 is a plan view of the apparatus provided for effecting a preselected spacing of the end cell elements on the conveyor means for suitable engagement, pickup and transfer to the end cell spaces at opposite ends of the battery case.
Figure 17:
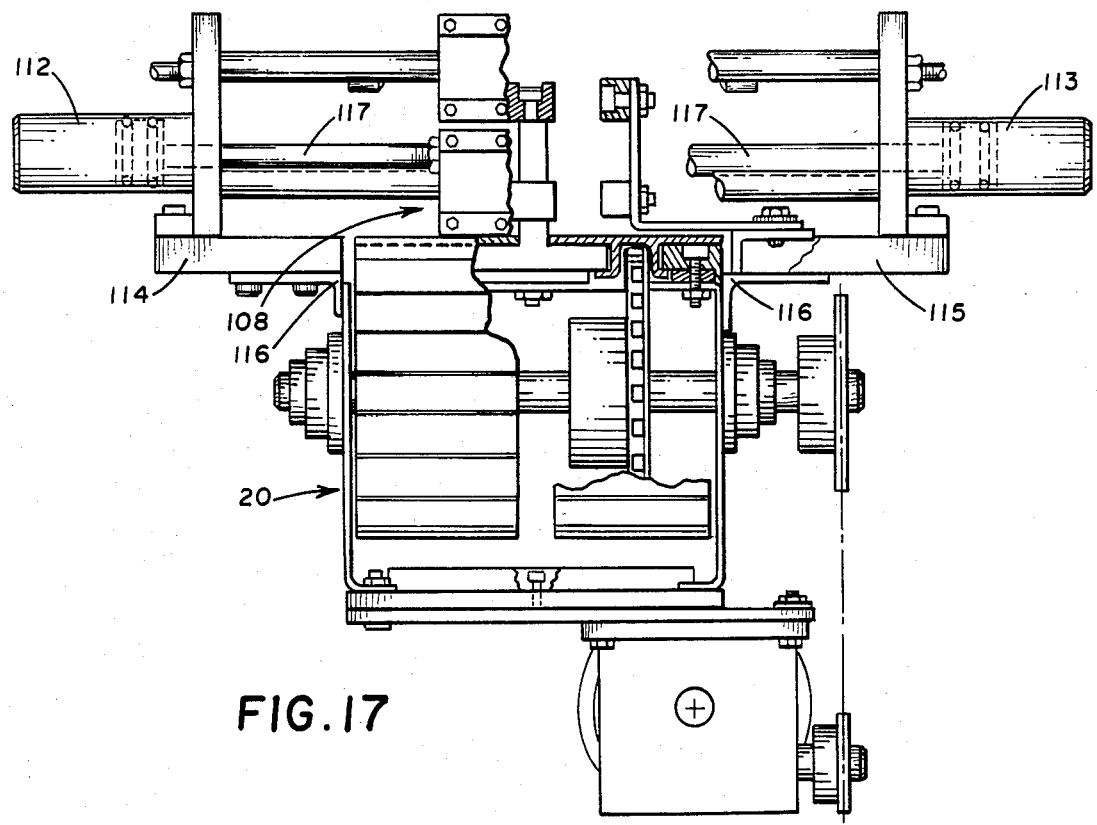
FIG. 17 is a fragmentary end elevation thereof.

As illustrated in FIGS. 16 and 17, guide rails 105 are associated with the end cell element conveyors 20 for guiding the end cell elements in a similar spaced relationship as effected by guide rails 48 relative to the intermediate cell elements, as illustrated in FIG. 6. To effect the desired wider spacing between the end cell elements for pickup, transfer and insertion by the end cell element pickup head 93, a spacer apparatus, generally designated 106 is provided. As seen in FIG. 16, the spacing apparatus 106 includes a pair of cell element receiving devices 108 and 109 aligned with the guide rails 105 to receive the end cell elements 38 and 39 against stops 110 and 111 thereof. The cell receiving devices 108 and 109 are selectively spaceable respectively by a pair of linear translators 112 and 113 mounted on suitable brackets 114 and 115 carried on the side frames 116 of the delivery conveyors 20, as seen in FIG. 17.

In the illustrated embodiment, the translating devices 112,113 comprise piston cylinder devices having piston rods 117 thereof connected to the cell element receivers 108 and 109 for selective positioning thereof perpendicular to the direction of travel of the conveyor. Suitable adjustable stop elements 118 are provided for accurately controlling the spacing of the receivers 108 and 109 in the spaced disposition effected by the translators 112 and 113.

Thus, spacing apparatus 106 accurately spaces the end cell elements 38 and 39 for pickup by the widely spaced pickup fingers 94 of the pickup head 93 of the second pickup and insert device 18. The end cell elements are delivered on conveyor 20 with the terminal posts 101 outermost so that no reversal manipulation of the picked-up end cell elements is required. Thus, the rotating device 81 may be omitted in apparatus 18.

Delivery of the end cell elements to the spacing apparatus 106 is sensed by a pair of sensors 119 and 120 (see FIG. 16). Sensing signals derived from the sensors 119 and 120 are provided to the control 21 which may be coordinated with the associated apparatus of the manufacturing line so as to suitably control stop actuator 40 and further prevent battery cases being delivered to the insert station 12 until such time as the intermediate cell and end cell sensors signal delivery of cell elements for insertion into the battery case, in addition to the control of the pickup apparatuses by the cell element sensing signals.

INDUSTRIAL APPLICABILITY

The method and apparatus for assembling battery components of the present invention as disclosed above provides an improved, low cost manufacturing step in the manufacture of multiplate batteries. The method and apparatus may be employed not only with the specific cell element structures discussed above but with a wide range of cell element configurations by suitable adaptation within the skill of the art. The method and apparatus are advantageously adapted for manufacture of batteries utilizing the multiplate cell elements of the disclosed invention and providing improved troublefree pickup, transferring and inserting means of the performed multiplate cell elements.

The method and apparatus are further advantageously adapted for use with the disclosed cell elements in providing accurate insertion with the cell elements properly related as to polarity one to the other in the assembly.

The method and apparatus are advantageously adapted for use with the disclosed cell elements in the provision of the novel means and method for engaging the cell elements in effecting the pickup, transfer and insertion of the cell elements.

As will be obvious to those skilled in the art, accurate control of the movement of the translating devices and actuators may be effected by the use of suitable adjustable limit switches as desired. The translating devices may comprise fluid-operated devices, such as pneumatic or hydraulic devices, as desired, as well as other forms of linear translators and the like.

In the illustrated embodiment, the 180° rotation of the pickup head is selectively effected, as required, during the transfer of the respective intermediate cell elements and is reversed during the return of the pickup head for picking up a subsequent pair of intermediate cell elements. As will be obvious to those skilled in the art, the structure may be alternatively arranged to permit pickup of the cell elements with the pickup head disposed in the rotated disposition, permitting subsequent 180° rotation of the pickup head in the same direction while reversing the subsequently picked-up pair of intermediate cell elements.

Suitable resetting of the different displacing devices in the X,Y and Z directions is effected concurrently with the return of the pickup and inserting apparatus to the cell pickup position so as to provide effectively minimized cycling time, thereby providing further improved efficiency in the manufacturing operation.

Likewise, the apparatus may be suitably designed and controlled to perform element insertion into battery containers having cell openings other than side-by-side arrangement such as commonly found in truck and other batteries, such as industrial batteries and the like. Further, it is contemplated that the container may remain stationary and the insertion apparatus indexed to insert position prior to insertion or, alternatively, the insert apparatus may remain stationary and the container indexed to various insert positions, or any combination of relative movement or indexing between the container and/or insert apparatus may be selected, as desired.

The foregoing disclosure of specific embodiments is illustrative of the broad inventive concepts comprehended by the invention.

We claim:

1. Apparatus for assembling battery components including a battery case having at least one divider wall defining a plurality of cell spaces opening through a top portion of the case, and a plurality of separate individual cell elements having electrical connecting means, said apparatus comprising:
   means for positioning a battery case at at least one insert station with the top portion uppermost;
   means for picking up a plurality of said separate cell elements;
   means for moving the cell elements picked up by said means for picking up cell elements to separate aligned positions over predesignated cell spaces with said electrical connecting means uppermost; and
   means for concurrently inserting the picked-up separate cell elements into said predesignated cell spaces to provide said cell elements in said spaces with a polarity arrangement for making series connections of the cell elements between said connecting means thereof.

2. The battery component assembly apparatus of claim 1 wherein said predesignated cell spaces are spaced apart by at least one cell space.

3. The battery component assembly apparatus of claim 1 wherein said means for moving the cell elements comprises means for rotating at least a portion of the cell elements 180° about a vertical axis thereof to cause said preselected disposition of the connecting means thereof.

4. The battery component assembly apparatus of claim 1 further including guide means for guiding the cell elements accurately into the respective cell spaces.

5. The battery component assembly apparatus of claim 1 wherein each said cell element includes two connector straps and said means for picking up and moving the cell elements comprises a pickup device engaging at least one of said straps, and means for moving the engaged pickup elements along a preselected path of movement to said aligned positions over said cell spaces.

6. The battery component assembly apparatus of claim 1 including means for repositioning the battery case with less than all of said plurality of cell elements inserted therein at another insert station prior to insertion of the remainder of said plurality of cell elements thereinto.

7. Apparatus for assembling battery components including a battery case having a plurality of divider walls defining a plurality of cell spaces opening through a top portion of the case, said cell spaces including terminal cell spaces and intermediate cell spaces, a plurality of intermediate cell elements having interconnecting means, and a pair of terminal cell elements having interconnecting means and terminal means, said apparatus comprising:

means for positioning a battery case at at least one insert station with the top portion uppermost;

means for picking up first and second intermediate cell elements;

means for moving first and second intermediate cell elements picked up by said means for picking up the cell elements to an aligned position over predesignated intermediate ones of the cell spaces with said interconnecting means uppermost;

means for inserting the picked-up intermediate cell elements into said predesignated intermediate ones of the cell spaces to provide the intermediate cell elements in said spaces with a polarity arrangement for making series connections of the cell elements between said connecting means thereof;

means for picking up a pair of terminal cell elements;

means for moving a pair of terminal cell elements picked up by said means for picking up a pair of terminal cell elements to aligned positions one each over the respective terminal cell spaces with said interconnecting means and terminal means uppermost; and means for inserting the picked-up terminal cell elements into said terminal cell spaces to provide each respective terminal cell element in said terminal cell space with a polarity arrangement for making series connection with the intermediate element in the adjoining cell.

8. The battery component assembly apparatus of claim 7 wherein said first cell elements include a pair of cell elements and said inserting means comprises means for inserting the first cell elements one each into cell spaces spaced apart by at least one cell space.

9. The battery component assembly apparatus of claim 7 wherein said means for moving the intermediate cell elements comprises means for rotating the intermediate cell elements 180° about a vertical axis thereof to cause said preselected disposition of the connecting means thereof.

10. The battery component assembly apparatus of claim 7 further including guide means selectively positioned adjacent the top portion of the battery case for cooperation with the inserting means for guiding the cell elements accurately into the respective cell spaces.

11. The battery component assembly apparatus of claim 7 wherein said cell elements include upper, parallel spaced connector straps and said means for picking up and moving the cell elements comprises pickup members having means for engaging the spaced straps of the respective cell elements, means for moving the pickup members into engagement with said spaced straps, and means for moving the engaged pickup members to said aligned positions over said predesignated cell spaces.

12. The battery component assembly apparatus of claim 7 including means for repositioning the battery case with the inserted intermediate cell elements therein at another insert station prior to the insertion of the end cell elements thereinto.

13. Apparatus for assembling battery components including a battery case having a plurality of divider walls defining a plurality of side-by-side cell spaces opening through a top portion of the case, said cell spaces including terminal cell spaces and intermediate cell spaces, a plurality of intermediate cell elements having interconnecting means, and a pair of terminal cell elements having interconnecting means and terminal means, said apparatus comprising:

means for positioning the battery case with the top portion uppermost at an insert station;

means for picking up first and second intermediate cell elements;

means for moving first and second intermediate cell elements picked up by said means for picking up the cell elements to an aligned position over intermediate ones of the cell spaces with said interconnecting means uppermost;

means for inserting the picked-up intermediate cell elements into said intermediate cell spaces with a proper polarity arrangement for making series connections of the cell elements between said connecting means thereof;

means for picking up a pair of terminal cell elements;

means for moving a pair of terminal cell elements picked up by said means for picking up a pair of terminal cell elements to aligned positions one each over the terminal cell spaces with said interconnecting means and terminal means uppermost;

means for inserting the picked-up terminal cell elements one each into said terminal cell spaces to provide a polarity arrangement of the terminal cell elements for making series connection thereof to the respective adjoining intermediate cell elements; and means for transferring the battery case with the inserted intermediate and terminal cell elements therein from said apparatus.

14. The battery component assembly apparatus of claim 13 including means for preventing insertion of the first intermediate cell element in the absence of a battery case being positioned at the insert station.

15. The battery component assembly apparatus of claim 13 wherein said inserting means comprises means for inserting the terminal cell elements following completion of the insertion of the intermediate cell elements into the intermediate cell spaces.

16. The battery component assembling apparatus of claim 13 including means for repositioning the battery case with the inserted intermediate cell elements therein at another insert station prior to the insertion of the terminal cell elements thereinto.

17. Apparatus for assembling battery components including a battery case having a plurality of divider walls defining a plurality of side-by-side cell spaces opening through a top portion of the case, said cell spaces including end cell spaces and intermediate cell spaces, a plurality of intermediate cell elements having interconnecting means, and a pair of end cell elements having interconnecting means and terminal means, said apparatus comprising:

means for positioning a battery case with the top portion uppermost at an insert station;
 means for picking up a first intermediate cell element;
 means for moving a first intermediate cell element picked up by said means for picking up the first intermediate cell element to an aligned position over a predesignated intermediate one of the cell spaces with said interconnecting means uppermost;
 means for inserting the picked-up intermediate cell element into said one predesignated intermediate cell space;
 means for picking up a second intermediate cell element;
 means for moving a second intermediate cell element picked up by said means for picking up a second intermediate cell element to an aligned position over a second predesignated intermediate cell space adjacent said one intermediate cell space with said interconnecting means uppermost;
 means for inserting the picked-up second intermediate cell element into said second predesignated intermediate cell space, to provide the intermediate cell elements in said space with a polarity arrangement for making series connection thereof to the respective adjoining cell elements through the divider walls;
 means for picking up a pair of end cell elements;
 means for moving a pair of end cell elements picked up by the means for picking up a pair of end cell elements to aligned positions one each over the respective end cell spaces with said interconnecting means and terminal means uppermost; and
 means for inserting the picked-up end cell elements one each into said respective end cell spaces to provide a polarity arrangement of the end cell elements for making series connection thereof to the intermediate cell elements in the respective adjacent cell spaces adjacent said end cell spaces.

18. The battery component assembling apparatus of claim 17 wherein each of said picking up means, moving means, and inserting means comprises means for simultaneously picking up, moving and inserting at least a pair of cell elements concurrently, said inserting means comprising means for concurrently inserting first intermediate cell elements into cells spaced apart by a distance equal to one cell space, whereby the insertion of the second intermediate cell elements is subsequent to the insertion of said first intermediate cell elements and comprises an interdigitation of said second intermediate cell elements relative to the spaced previously inserted first intermediate cell elements.

19. The battery component assembling apparatus of claim 17 wherein said picking up means, moving means, and inserting means comprise means for picking up, moving, and inserting at least one additional cell element concurrently with said picking up, moving, and inserting of each of said first and second cell elements, said inserting means comprising means for inserting the concurrently inserted intermediate cell elements into cells spaced apart by a cell space, whereby the insertion of the second intermediate cell elements comprises an interdigitation of said second intermediate cell elements relative to the spaced previously inserted first intermediate cell elements, said inserting means including guide means selectively positioned adjacent the top portion of the battery case during insertion of at least one of the cell elements for guiding the cell elements accurately into the respective cell spaces.

20. The battery component assembling apparatus of claim 17 including means for relatively repositioning the battery case with the inserted intermediate cell elements therein with respect to another insert station prior to the insertion of the end cell elements thereinto.

21. The battery component assembling apparatus of claim 17 wherein said picking up means, moving means, and inserting means comprise means for picking up, moving, and inserting at least one additional cell element concurrently with said picking up, moving, and inserting each of said first and second cell elements, said inserting means comprising means for inserting the concurrently inserted intermediate cell elements into cells spaced apart by a cell space, whereby the insertion of the second intermediate cell elements comprises an interdigitation of said second intermediate cell elements relative to the spaced previously inserted first intermediate cell elements, and further including means for relatively repositioning the battery case with the inserted intermediate cell elements therein at another insert station prior to the insertion of the end cell elements thereinto.

22. Apparatus for assembling battery components including a battery case having a plurality of divider walls defining a plurality of side-by-side cell spaces opening through a top portion of the case, said cell spaces including end cell spaces and intermediate cell spaces, a plurality of intermediate cell elements having interconnecting means, and a pair of end cell elements having interconnecting means and terminal means, said apparatus comprising:

means for positioning a battery case relative to a first insert station with the top portion uppermost;
 means for picking up a plurality of intermediate cell elements;
 means for moving a plurality of intermediate cell elements picked up by said means for picking up the cell elements relative to an aligned position over a plurality of predesignated intermediate cell spaces with said interconnecting means uppermost;
 means for inserting the picked-up intermediate cell elements into said predesignated intermediate cell spaces;
 means for relatively repositioning said battery case with said intermediate cell elements therein relative to a second insert station with the top uppermost;
 means for picking up a pair of end cell elements;
 means for moving a pair of end cell elements picked up by said means for picking up a pair of end cell elements relative to positions one each over the end cell spaces with said interconnecting means and terminal means uppermost; and
 means for inserting the picked-up end cell elements one each into said end cell spaces, to provide a polarity arrangement of the end cell elements for making series connection thereof to the respective intermediate cell elements previously inserted into the adjacent cell space.

23. The battery component assembling apparatus of claim 22 including sensing control means for preventing operation of the means for inserting the end cell elements until a battery case is sensed at said second insert station.

24. The battery component assembling apparatus of claim 22 including means for causing the spacing of the end cell elements to be adjusted after being picked up to have accurate alignment with said end cell spaces.

25. The battery component assembling apparatus of claim 22 further including guide means selectively positionable over the battery case prior to insertion of the end cell elements for accurately guiding the end cell elements into said end cell spaces.

26. The battery component assembling apparatus of claim 22 further including clamp means for clamping said battery case against movement during insertion of said end cell elements thereinto.

27. The battery component assembling apparatus of claim 22 wherein said end cell elements are provided with connection straps at a top portion thereof and said picking up means comprises means for picking up said end cell elements by said straps.

28. The battery component assembling apparatus of claim 22 wherein said terminal means comprises an upright terminal and said inserting means inserts said end cells into the battery case to dispose said end cells therein with said terminal projecting upwardly from said top portion of the battery case.

29. Apparatus for assembling battery components including a battery case having at least one divider wall defining a plurality of cell spaces opening through a top portion of the case, and a plurality of separate individual cell elements each having electrode plates and electrical connecting means interconnecting said plates, said apparatus comprising:
   means for positioning a battery case at at least one insert station with the top portion uppermost;
   means for engaging the connecting means for picking up said separate cell elements; and
   means for concurrently inserting separate cell elements picked up by said means for picking up the cell elements into said cell spaces with said connecting means thereof accurately positioned in the respective said cell spaces and thereby further causing said cell elements to be accurately positioned in said cell spaces.

30. The battery component assembling apparatus of claim 29 wherein each said electrical connecting means comprises a strap extending across a top portion of the cell element.

31. The battery component assembling apparatus of claim 29 wherein each said electrical connecting means comprises a strap extending across a top portion of the cell element and said means for engaging the connecting means comprises means engaging said strap.

32. The battery component assembling apparatus of claim 29 wherein each said electrical connecting means comprises a strap extending across a top portion of the cell element and said means for engaging the connecting means comprises means for clampingly engaging said strap.

33. The battery component assembling apparatus of claim 29 wherein each said electrical connecting means comprises a strap extending across a top portion of the cell element, said means for engaging the connecting means comprises means for engaging said strap and said inserting means comprises means for accurately positioning said strap relative to the battery case as an incident of the insertion of the cell element into the case.

34. The battery component assembling apparatus of claim 29 wherein each said electrical connecting means comprises a strap extending across a top portion of the cell element, said means for engaging the connecting means comprises means for engaging said strap and said inserting means comprises guide means for accurately positioning said strap relative to the battery case as an incident of the insertion of the cell element into the case.

35. The battery component assembling apparatus of claim 29 wherein each said electrical connecting means comprises a strap extending across a top portion of the cell element and said means for engaging the connecting means comprises means engaging said strap including means for engaging the opposite ends of the strap for accurately positioning the strap and associated cell element in the cell space in the direction of longitudinal extension of the strap below said ends.

36. The battery component assembling apparatus of claim 29 wherein each said electrical connecting means comprises a strap extending across a top portion of the cell element and said means for engaging the connecting means comprises means engaging said strap including means for engaging the opposite ends of the strap for accurately positioning the strap and associated cell element in the cell space in the direction of longitudinal extension of the strap below said ends between opposite sidewalls of the battery case.

37. The battery component assembling apparatus of claim 29 wherein each said electrical connecting means comprises a strap extending across a top portion of the cell element and said means for engaging the connecting means comprises means engaging opposite portions of said strap.

38. The battery component assembling apparatus of claim 29 wherein each said electrical connecting means comprises a strap extending across a top portion of the cell element and said means for engaging the connecting means comprises means engaging opposite top and bottom surface portions of said strap.

39. The battery component assembling apparatus of claim 29 wherein each said electrical connecting means comprises a strap extending across a top portion of the cell element and said means for engaging the connecting means comprises means engaging opposite end portions and top and bottom surface portions of said strap.

40. The battery component assembling apparatus of claim 29 wherein each said electrical connecting means comprises a pair of parallel spaced straps extending across a top portion of the cell element.

41. The battery component assembling apparatus of claim 29 wherein each said electrical connecting means comprises a pair of parallel spaced straps extending across a top portion of the cell element and said means for engaging the connecting means comprises means for engaging each said strap.

42. The battery component assembling apparatus of claim 29 wherein each said electrical connecting means comprises a pair of parallel spaced straps extending across a top portion of the cell element and said means for engaging the connecting means comprises means for engaging opposite portions of each said strap.

43. Apparatus for assembling battery components including a battery case having at least one divider wall defining a plurality of cell spaces opening through a top portion of the case, and a plurality of separate individual cell elements equal in number to said cell spaces, each cell element having electrical connecting means, said apparatus comprising:

means for positioning a battery case at at least one insert station with the top portion uppermost;

means for picking up said separate cell elements;

means for selectively turning one or more cell elements picked up by said means for picking up the cell elements end-for-end to arrange the separate cell elements with the polarity thereof proper for making a preselected series connection of the cell elements between said connecting means thereof; and means for concurrently inserting the picked-up cell elements separately into said cell spaces.

44. The battery component assembling apparatus of claim 43 wherein said cell element includes a pair of end cell elements and intermediate cell elements, said selective turning means comprising means for selectively turning said intermediate cell elements end-for-end.

45. The battery component assembling apparatus of claim 43 wherein said cell element includes a pair of end cell elements and intermediate cell elements, said selective turning means comprising means for selectively turning picked-up pairs of said intermediate cell elements end-for-end.

46. The battery component assembling apparatus of claim 43 including conveyor means for delivering said cell elements to said picking-up means with the polarity thereof selectively proper for making a preselected series connection between the connecting means of the cell element inserted into said battery case.

47. The method of assembling battery components including a battery case having at least one divider wall defining a plurality of cell spaces opening through a top portion of the case, and a plurality of separate individual cell elements equal in number to said cell spaces and having electrical connecting means, said method comprising the steps of:

positioning a battery case at at least one insert station with the top portion uppermost;

picking up said separate cell elements;

moving the picked-up cell elements separately to an aligned position over predesignated cell spaces with said electrical connecting means uppermost; and concurrently inserting the picked-up separate cell elements into said predesignated cell spaces to provide said cell elements in said spaces with a polarity arrangement for making series connections of the cell elements between said connecting means thereof.

48. The method of assembling battery components of claim 47 wherein at least a portion of the cell elements are rotated 180° about a vertical axis thereof to cause said preselected disposition of the connecting means thereof.

49. The method of assembling battery components of claim 47 including the step of providing guide means for guiding the cell elements accurately into the respective cell spaces during the inserting step.

50. The method of assembling battery components of claim 47 wherein each said cell element includes two connector straps and said step of picking up the cell elements comprises a step of picking up the cell elements by at least one of said straps.

51. The method of assembling battery components of claim 47 including the step of repositioning the battery case with less than all of said plurality of cell elements inserted therein at another insert station prior to insertion of the remainder of said plurality of cell elements thereinto.

52. The method of assembling battery components including a battery case having a plurality of divider walls defining a plurality of cell spaces opening through a top portion of the case, said cell spaces including terminal cell spaces and intermediate cell spaces, a plurality of intermediate cell elements having interconnecting means, and a pair of terminal cell elements having interconnecting means and terminal means, said method comprising the steps of:

positioning a battery case at at least one insert station with the top portion uppermost;

picking up first and second intermediate cell elements;

moving the picked-up cell elements to an aligned position over predesignated intermediate ones of the cell spaces with said interconnecting means uppermost;

inserting the picked-up intermediate cell elements into said predesignated intermediate ones of the cell spaces to provide the intermediate cell elements in said spaces with a polarity arrangement for making series connections of the cell elements between said connecting means thereof;

picking up a pair of terminal cell elements;

moving the picked-up pair of terminal cell elements to aligned positions one each over the respective terminal cell spaces with said interconnecting means and terminal means uppermost; and inserting the picked-up terminal cell elements into said terminal cell spaces to provide each respective terminal cell element in said terminal cell space with a polarity arrangement for making series connection with the intermediate element in the adjoining cell.

53. The method of assembling battery components of claim 52 including the step of repositioning the battery case with the inserted intermediate cell elements therein at another insert station upon insertion of the end cell elements thereinto.

54. The method of assembling battery components including a battery case having a plurality of divider walls defining a plurality of side-by-side cell spaces opening through a top portion of the case, said cell spaces including end cell spaces and intermediate cell spaces, a plurality of intermediate cell elements having interconnecting means, and a pair of end cell elements having interconnecting means and terminal means, said method comprising the steps of:

positioning the battery case with the top portion uppermost at an insert station;

picking up first and second intermediate cell elements;

moving the picked-up cell elements to an aligned position over intermediate ones of the cell spaces with said interconnecting means uppermost;

inserting the picked up intermediate cell elements into said intermediate cell spaces with a proper polarity arrangement for making series connections of the cell elements between said connecting means thereof;

picking up a pair of terminal cell elements;

moving the picked-up pair of terminal cell elements to aligned positions one each over the terminal cell spaces with said interconnecting means and terminal means uppermost;

inserting the picked-up terminal cell elements one each into said terminal cell spaces to provide a polarity arrangement of the terminal cell elements for making series connection thereof to the respective adjoining intermediate cell elements; and transferring the battery case with the inserted intermediate and terminal cell elements therein from said apparatus.

55. The method of assembling battery components of claim 54 wherein insertion of the first intermediate cell element is automatically prevented in the absence of a battery case being positioned at the insert station.

56. The method of assembling battery components of claim 54 wherein said terminal cell elements are inserted following completion of the insertion of the intermediate cell elements into the intermediate cell spaces.

57. The method of assembling battery components of claim 54 including the step of repositioning the battery case with the inserted intermediate cell elements therein at another insert station prior to the insertion of the terminal cell elements thereinto.

58. The method of assembling battery components including a battery case having a plurality of divider walls defining a plurality of side-by-side cell spaces opening through a top portion of the case, said cell spaces including end cell spaces and intermediate cell spaces, a plurality of intermediate cell elements having interconnecting means, and a pair of end cell elements having interconnecting means and terminal means, said method comprising the steps of:

positioning a battery case with the top portion uppermost at an insert station;

picking up a first intermediate cell element;

moving the picked-up cell element to an aligned position over a predesignated intermediate one of the cell spaces with said interconnecting means uppermost;

inserting the picked-up intermediate cell element into said one predesignated intermediate cell space;

picking up a second intermediate cell element;

moving said picked-up second intermediate cell element to an aligned position over a second predesignated intermediate cell space adjacent said one intermediate cell space with said interconnecting means uppermost;

inserting the picked-up second intermediate cell element into said second predesignated intermediate cell space, to provide the intermediate cell elements in said space with a polarity arrangement for making series connection thereof to the respective adjoining cell elements through the divider walls;

picking up a pair of end cell elements;

moving the picked-up pair of end cell elements to aligned positions one each over the respective end cell spaces with said interconnecting means and terminal means uppermost; and inserting the picked-up cell elements one each into said respective end cell spaces to provide a polarity arrangement of the end cell elements for making series connection thereof to the intermediate cell elements in the respective adjacent cell spaces adjacent said end cell spaces.

59. The method of assembling battery components of claim 58 wherein at least one pair of cell elements are concurrently picked up, moved, and inserted with the pair of cell elements being spaced apart a distance equal to one cell space.

60. The method of assembling battery components of claim 58 wherein the intermediate cell elements are concurrently inserted into cells spaced apart by a cell space, whereby insertion of a second group of intermediate cell elements comprises an interdigitation of said second intermediate cell elements relative to the spaced previously inserted intermediate cell elements.

61. The method of assembling battery components including a battery case having a plurality of divider walls defining a plurality of side-by-side cell spaces opening through a top portion of the case, said cell spaces including end cell spaces and intermediate cell spaces, a plurality of intermediate cell elements having interconnecting means, and a pair of end cell elements having interconnecting means and terminal means, said method comprising the steps of:

positioning a battery case relative to a first insert station with the top portion uppermost;

picking up a plurality of intermediate cell elements;

moving the picked-up cell elements relative to an aligned position over a plurality of predesignated intermediate cell spaces with said interconnecting means uppermost;

inserting the picked-up intermediate cell elements into said predesignated intermediate cell spaces;

repositioning said battery case with said intermediate cell elements therein relative to a second insert station with the top uppermost;

picking up a pair of end cell elements;

moving the picked-up pair of end cell elements relative to positions one each over the end cell spaces with said interconnecting means and terminal means uppermost; and inserting the picked-up end cell elements one each into said end cell spaces, to provide a polarity arrangement of the end cell elements for making series connection thereof to the respective intermediate cell elements previously inserted into the adjacent cell space.

62. The method of assembling battery components of claim 61 wherein operation of the means for inserting the end cell elements is prevented until a battery case is sensed at said second insert station.

63. The method of assembling battery components including a battery case having at least one divider wall defining a plurality of cell spaces opening through a top portion of the case, and a plurality of separate individual cell elements equal in number to said cell spaces each having electrode plates and electrical connecting means interconnecting said plates, said method comprising the steps of:

positioning a battery case at at least one insert station with the top portion uppermost;

engaging the connecting means of a plurality of said separate cell elements for picking up said plurality of separate cell elements; and concurrently inserting cell elements picked up by said means for picking up the cell elements separately into said cell spaces with said connecting means thereof accurately positioned in the respective said cell spaces and thereby further causing said cell elements to be accurately positioned in said cell spaces.

64. The method of assembling battery components of claim 63 wherein each said electrical connecting means comprises a strap extending across a top portion of the cell element and said strap is engaged by the engaging means.

65. The method of assembling battery components of claim 63 wherein each said electrical connecting means comprises a strap extending across a top portion of the cell element and opposite portions of the strap are engaged by the engaging means.

66. The method of assembling battery components of claim 63 wherein each said electrical connecting means comprises a pair of parallel spaced straps extending across a top portion of the cell element, each of said straps being engaged concurrently by said engaging means.

67. The method of assembling battery components of claim 63 wherein each said electrical connecting means comprises a pair of parallel spaced straps extending across a top portion of the cell element and the straps are engaged at opposite top and bottom surface portions thereof.

68. The method of assembling battery components including a battery case having at least one divider wall defining a plurality of cell spaces opening through a top portion of the case, and a plurality of separate individual cell elements equal in number to said cell spaces each having electrical connecting means, said method comprising the steps of:

positioning a battery case at at least one insert station with the top portion uppermost;

picking up a plurality of said separate cell elements;

selectively turning one or more of the picked-up plurality of separate cell elements end-for-end to arrange the cell elements with the polarity thereof proper for making a preselected series connection of the cell elements between said connecting means thereof; and concurrently inserting the picked-up cell elements separately into said cell spaces.

69. The method of assembling battery components of claim 68 wherein said cell element includes a pair of end cell elements and intermediate cell elements, only said intermediate cell elements being turned end-for-end.

70. The method of assembling battery components of claim 68 wherein said cell element includes a pair of end cell elements and a pair of intermediate cell elements, only said pair of picked-up intermediate cell elements being turned end-for-end.

* * * * *